March 19, 1968 W. C. WOODWARD 3,373,994
METHOD OF ACHIEVING VERTICAL DISPLACEMENT OF A TOWED
TARGET FROM A TOWING AIRCRAFT
Filed Jan. 25, 1966
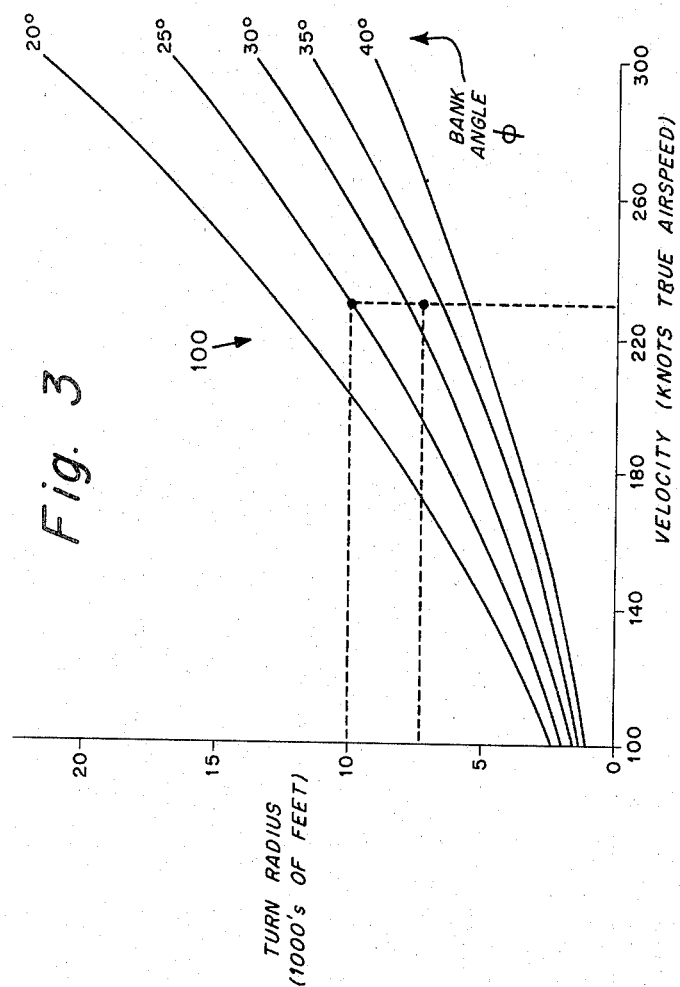
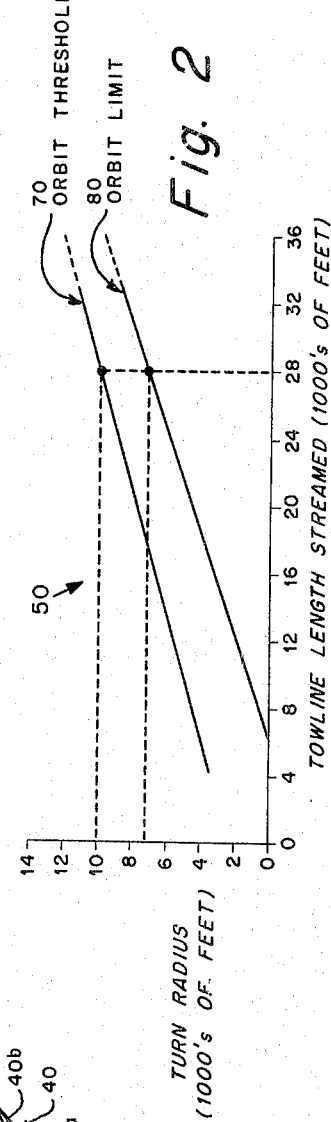
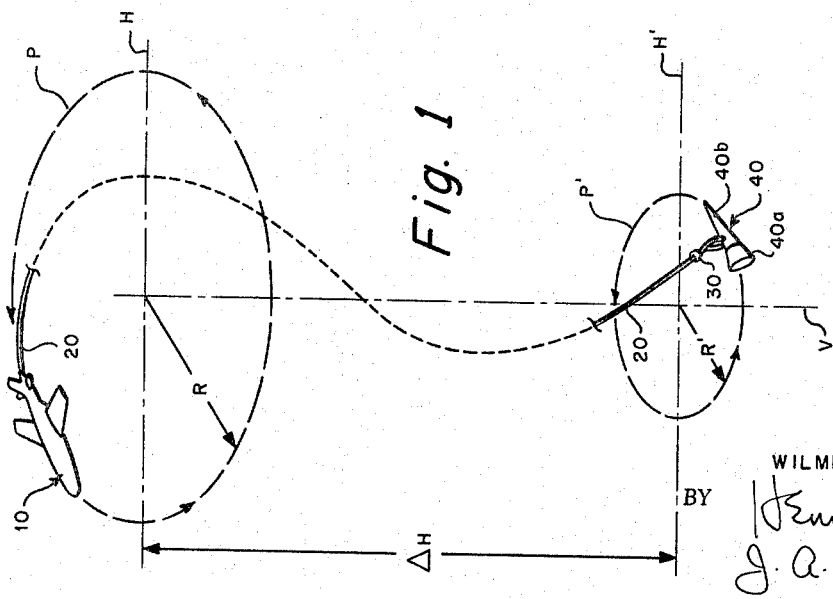
INVENTOR.
WILMER C. WOODWARD
BY
ATTORNEYS

United States Patent Office 3,373,994
Patented Mar. 19, 1968

3,373,994
METHOD OF ACHIEVING VERTICAL DISPLACEMENT OF A TOWED TARGET FROM A TOWING AIRCRAFT
Wilmer C. Woodward, Blue Bell, Pa., assignor to the United States of America as represented by the Secretary of the Navy
Filed Jan. 25, 1966, Ser. No. 522,989
3 Claims. (Cl. 273—105.3)

The invention described herein may be manufactured and used by or for the Government of the United States of America for governmental purposes without the payment of any royalties thereon or therefor.

The present invention relates to a tow target system and more particularly to a tow target system wherein the target is towed vertically of the towing aircraft.

The present and growing sophistication of military missile and gunnery systems requires a concomitant sophisticated approach in the design of target arrangements utilized in both the evaluation of these newly developed missile and gunnery systems and in the training in the use thereof. When the classic targetry systems were used, the sensitive modern weapons caused inadvertent damage to the towing aircraft since the latter was within the range of these weapons being used against the target. Therefore, there presently exists the danger of both the aircraft and the pilot that the missile will inadvertently attack the towing aircraft rather than or in addition to the target trailing behind the towing aircraft.

In order to obviate this deleterious condition it was decided that the target should be at a sufficient vertical distance below the towing aircraft to enable the towing aircraft to be beyond the range of the missile or other military equipments. It became obvious that it was necessary to obtain a large vertical component of the cable. Since it is not possible to alter appreciably the droop angle of a long towline by increasing the weight of the cable and/or towed body, because of aerodynamic forces on the cable (which increase with increase in cable droop angle), another means of obtaining a large vertical component of the towline was devised. This alternate method involved "orbiting" of the towing aircraft in a continuous series of relatively-tight, banked 360° turns. During these turns, the target tended to "orbit" in a smaller diameter turn, and at a lower speed than that of the towing aircraft. As the dynamic pressure on the target and adjoining towline decreases, the drag on these components likewise decreases, while their respective weights remain constant. The net effect discovered was a continuing downward movement of the towed body and towline until an equilibrium condition was attained.

It is an object of the present invention to provide a method for towing a cable vertically of a towing aircraft.

A further object of the present invention is to provide a method for towing a cable vertically of a towing aircraft and for changing the vertical separaiton between the free end of the cable and the towing aircraft.

An additional object of the present invention is to provide a tow target system in which a target, connected by a cable to a towing aircraft, is towed at an extensive vertical distance below the towing aircraft.

A still further object of the present invention is to provide a method for towing a target vertically of a towing aircraft and for changing the vertical separation between the target and the towing aircraft.

Still another object of the present invention is to eliminate the aforesaid dangerous condition by providing a tow target system wherein the target is towed vertically of the towing aircraft and at an extensive distance therefrom so that the towing aircraft can be at an altitude beyond the range of the weapons being used against the target.

Various other objects and advantages will appear from the following description of an embodiment of the invention, and the novel features will be particularly pointed out hereinafter in connection with the appended claims.

In the drawings:

FIG. 1 is a schematic representation of the novel target towing arrangement;

FIG. 2 is an orbit-boundary graph with turning radius of the towing aircraft plotted against the length of towline streamed; and FIG. 3 is a plot of turning radius versus true airspeed for various bank angles.

Referring now to FIG. 1, there is illustrated therein a towing aircraft generally indicated at 10 having attached to the rear thereof a towline generally indicated at 20. Towline 20 is connected at the free end thereof through swivel 30 to a tow target indicated generally at 40.

The towing aircraft 10 contains a tow reel, not shown, of the type known and used in the art for paying in and paying out the tow line 20. The reel is of the type which is capable of housing and accommodating extensive lengths of towlines, for example, 32,000 feet. The towline per se may be of the type known and used in the art and may be, for example, 0.156-inch diameter copper-armored, 0.125-inch diameter armored-steel, 0.210-inch diameter copper-armored, or similar towlines of this nature. It is further understood, of course, that the towing aircraft 10 is equipped with an appropriate launcher, not shown, for launching and recovering the target and for stowage thereof during captive flight.

As illustrated in FIG. 1, the target 40 is connected at the center of gravity thereof to the towline 20 through swivel 30 and may be of the type disclosed and illustrated in application Ser. No. 429,176 of Wilmer C. Woodward et al. for Off-Set Tow Target filed Jan. 29, 1965, now U.S. Patent No. 3,311,376. Although a center of gravity towed target is illustrated in FIG. 1 it should be understood that a nose-towed target of the type known and used in the art could be utilized in the present invention without departing from the spirit thereof. The target 40 additionally produces a sufficient amount of drag or tension on the extensive towline to prevent objectionable cable oscillation, the towed body 40 in itself being stable so as not to excite the towline 20.

The target 40 includes suitably instrumented and/or augmented equipments 40a as required for the applicable missile evaluation, or gunnery firing exercise being performed against the target and is further equipped with an altimeter generally indicated at 40b which permits the pilot of the towing aircraft 10 to determine the altitude of the target. The latter arrangement is of a type known and used in the art.

As illustrated in FIG. 1, the towing aircraft 10 is flying along a path P at an altitude generally indicated at H and at a radius R from the vertical axis V. The target 40 is at a large vertical separation ΔH from the towing aircraft 10 and is shown at an altitude H'. It should be observed that the target 40 at this separation ΔH orbits about the vertical axis V, the orbit path P' being smaller than that of the towing aircraft 10 and having a radius R'. The vertical separation ΔH is that distance which enables the towing aircraft 10 to safely orbit beyond the range of the particular missile being used against the target 40.

In order for the pilot to know at what speed and at what radius R the towing aircraft 10 must fly in order to attain the desired vertical separation ΔH for a given length of cable 20 streamed from the towing aircraft 10, reference is now made to FIGS. 2 and 3.

With particular reference to FIG. 2 there is shown an orbit-boundary graph 50 wherein the length of streamed towline in thousands of feet is plotted against the turning radius in thousands of feet of the towing aircraft. It should be understood that the information contained in the orbit-boundary graph 50 is substantially independent of the particular type and diameter (i.e. mass-density) towing cable utilized and is independent of the altitude at which the towing aircraft 10 orbits. Therefore, the graph of FIG. 2 is representative of a common set of orbit-boundary limitations applicable to all airplane/towline configurations.

After flight testing by streaming a target to various lengths, flying the towing aircraft at various turning radii, and recording the vertical separation at each of these conditions—it was discovered that for a given particular length of streamed towline there exists a turning radius R at which a significant increase in verticality of the towline is obtained. Furthermore, it was discovered for each different length of towline streamed there was a different turning radius R at which the towline began to show a significant increase in verticality. By connecting these test points which correspond to the threshold of increasing verticality in the towline, an upper limit line or orbit threshold line indicated at 70 was constructed.

Similarly, it was discovered that for a given length of streamed towline there exists a turning radius R at which there occurred a rapid increase in verticality and at which flight equilibrium of the target could no longer be sustained. For any other given length of streamed towline there was discovered to exist a different turning radius R at which equilibrium was no longer sustained. By connecting these test points which represented orbiting conditions beyond which the flight equilibrium of the target could no longer be sustained, the lower limit line or orbit limit indicated at 80 was constructed.

Therefore, within the boundary formed by these two limit lines 70 and 80, increased verticality in the towline 20 can be obtained and sustained. For any specific towline length, the degree of verticality ΔH will increase as the turning radius R is progressively decreased from the orbit-threshold boundary line 70 to the orbit-limit boundary line 80. It should be noted that the towline 20 stalls—that is, does not orbit—when the turning radius is decreased to the value at the orbit limit line 80.

Since the turning radius R is the predominant controlling factor for increasing the verticality ΔH of any specific towline length, it was observed that considerable flexibility was available in the method of obtaining this turning radius. The graph 100 of FIG. 3 is representative of this flexibility and of the equation:

$$R = \frac{V^2}{g} \tangent \phi$$

where R is the turning radius, V the airspeed, and $\phi$ the bank angle of the aircraft.

In view of this relationship and the graph 100, various combinations of the above performance parameters may be selected which produce the desired value of R. This permits the selection of those airplane performance parameters most easily obtained by the towing aircraft 10 or those conditions most comfortable to the pilot of the towing aircraft 10. In other words, by referring to the graph 100 of FIG. 3 which relates the airspeed and bank angles (for coordinated turns) to turning radius, it is possible for the pilot to select the towing aircraft performance parameters (speed and bank angle) considered most desirable. For example, a turning radius of 10,000 feet may be obtained by flying the towing aircraft 10 at a bank angle of 20° and at a velocity of 202 knots true airspeed or by flying the towing aircraft 10 at a bank angle of 25° at a velocity of 230 knots true airspeed.

A description of the use of the novel method and system indicated above is as follows: The towing aircraft 10 is flown to an altitude H at which the aircraft would be beyond the range of the missile. The aircraft 10 is maintained at a straight and level flight altitude and the target 40 is streamed to a selected cable length, here, for example, 28,000 feet. Reference to the orbit-boundary graph 50 of FIG. 2 and orbit-threshold line 70 reveals that at a towline length of 28,000 feet the target 40 will begin to orbit and the towline 20 attain flight equilibrium when the towing aircraft 10 flies a turning radius R of 10,000 feet. Similarly, the turning radius R corresponding to the orbit-limit boundary line 80 for a towline length of 28,000 feet is 7,200 feet. If the pilot of a towing aircraft 10 then selects a desired true airspeed of 230 knots, then reference to FIG. 3 indicates that the intersection of the 230 knots true airspeed line with lines through the above-mentioned turning radii gives the towing aircraft bank angles corresponding to the orbit-threshold and orbit-limit conditions, which are here 25° and 33°, respectively.

With this desired airspeed held constant, the towline 20 will attain flight equilibrium at towing aircraft bank angles between these limits, and towline verticality ΔH will increase as the bank angle $\phi$ is progressively increased from 25° to 33°. At bank angles greater than 33° the towed cable 20 will stall and approach a "standing line."

Therefore, it is seen that the pilot can adjust the separation of the target 40 from the towing aircraft 10 by adjusting the bank angle $\phi$ of the towing aircraft 10 between 25° and 33°. The actual altitude H' of the target 40 can further be determined by reference to the signals received from the target altimeter 40a. When the desired altitude H' of the target 40 is attained and the vertical separation ΔH between the target 40 and towing aircraft 10 is also attained, the towing aircraft 10 is flown to maintain the above-indicated altitude, airspeed and bank angle.

It should be observed that if it be desired to change the altitude of the orbiting target 40 either the aircraft 10 can change the altitude at which it is orbiting or a different length of towline 20 can be streamed. The latter approach would be used when a decrease in towing aircraft altitude would place the same within the range of the missile being used against the target. The latter approach necessitates a recalculation in the manner described above. The graph 50 of FIG. 2 would be consulted to obtain the new turning radii corresponding to the orbit-threshold and orbit-limit boundary lines 70 and 80, respectively, for the new towline length. Subsequent reference to the graph 100 of FIG. 3 will provide the towing aircraft bank angles $\phi$ corresponding to the orbit-threshold and orbit-limit conditions.

Obviously many modifications and variations of the present invention are possible in the light of the above teachings. It is therefore to be understood that within the scope of the appended claims, the invention may be practiced otherwise than as specifically described.

What is claimed is:

1. In a target system, the method of positioning a towed target at a predetermined vertical distance below the towing aircraft so that the aircraft is at an altitude beyond the range of the weapons being used against the target, comprising:
   continuously flying the towing aircraft in a predetermined fixed orbit calculated to achieve a desired vertical distance of the target below said towing aircraft;
   and maintaining said towing aircraft in said predetermined fixed orbit.

2. The method of claim 1 being particularly characterized by the preliminary steps comprising:
   flying the towing aircraft together with the streamed target at various combinations of bank angle, airspeed, and cable lengths;
   recording the corresponding vertical separation for each of said combinations;

selecting a desired vertical separation;
flying the towing aircraft and one of said combinations recorded to obtain said desired vertical separation.

3. The method of claim 2 wherein flying the towing aircraft at one of said combinations recorded to obtain said desired vertical separation includes the steps of:
  maintaining the towing aircraft at a predetermined straight and level altitude;
  streaming the target to a predetermined cable length;
  adjusting the speed of the towing aircraft to a predetermined airspeed;
  banking the towing aircraft at an angle which for the predetermined airspeed provides a predetermined turning radius;
  maintaining the aforesaid altitude, airspeed and bank angle;
  whereby the target will descend until the desired vertical separation between the towing aircraft and the target is obtained.

References Cited

UNITED STATES PATENTS 1,857,893   5/1932   Udet _____ 273—105.3

FOREIGN PATENTS 291,396   10/1928   Great Britain.

OTHER REFERENCES

Science and Invention, July 1930, p. 228; copy in class 273, subclass 105.3.

ANTON O. OECHSLE, *Primary Examiner.*

M. R. PAGE, *Assistant Examiner.*